United States Patent [19]

Kap

[11] Patent Number: 4,941,087
[45] Date of Patent: Jul. 10, 1990

[54] SYSTEM FOR BUMPLESS CHANGEOVER BETWEEN ACTIVE UNITS AND BACKUP UNITS BY ESTABLISHING ROLLBACK POINTS AND LOGGING WRITE AND READ OPERATIONS

[75] Inventor: Mladen Kap, Västerås, Sweden

[73] Assignee: ASEA Aktiebolag, Västerås, Sweden

[21] Appl. No.: 97,784

[22] Filed: Sep. 18, 1987

[30] Foreign Application Priority Data

Sep. 19, 1986 [SE] Sweden ................... 8603945

[51] Int. Cl.$^5$ ............... G06F 11/20; G06F 11/30
[52] U.S. Cl. .................. 364/200; 364/268; 364/268.3; 364/269.2; 364/267.1; 364/187; 371/12
[58] Field of Search ... 364/200 MS File, 900 MS File, 364/132, 187; 371/12

[56] References Cited

U.S. PATENT DOCUMENTS

| | | | |
|---|---|---|---|
| 4,037,088 | 7/1977 | Davis et al. | 364/300 X |
| 4,057,715 | 11/1977 | Jones et al. | 364/434 |
| 4,099,241 | 7/1978 | Ossfeldt | 364/200 |
| 4,351,023 | 9/1982 | Richer | 364/187 |
| 4,466,098 | 8/1984 | Southard | 371/9 |
| 4,493,035 | 1/1985 | MacGregor et al. | 371/12 X |
| 4,507,751 | 3/1985 | Gawlick et al. | 364/900 |
| 4,581,701 | 4/1986 | Hess et al. | 364/187 |
| 4,628,508 | 12/1986 | Sager et al. | 364/187 |
| 4,635,184 | 1/1987 | Schuss | 364/187 |
| 4,654,819 | 3/1987 | Stiffler et al. | 364/900 |
| 4,697,266 | 9/1987 | Finley | 371/12 |
| 4,751,639 | 6/1988 | Corcoran et al. | 364/200 |
| 4,751,702 | 6/1988 | Beier et al. | 364/200 X |

OTHER PUBLICATIONS

Christiansen et al. "Reliability and Serviceability Check Log" IBM TDB vol. 25, No. 6, Nov. 1982, pp. 3050–3051.

Crus et al "Incremental Data Base Log Image Copy", IBM TDB vol. 25, No. 7B, Dec. 1982, pp. 3730–3732.

*Primary Examiner*—David Y. Eng
*Assistant Examiner*—Thomas C. Lee
*Attorney, Agent, or Firm*—Pollock, Vande, Sande & Priddy

[57] ABSTRACT

The central unit of a computer equipment has a processor and a memory as well as redundant units as backup units for the processor and/or the memory. Further, there are members for changeover from an active unit to a corresponding backup unit in the event of a fault in the active unit. The central unit has interrupt routines and carries out write and read operations against the peripheral units of the equipment. A bumpless changeover from an active unit to a backup unit is obtained by establishing rollback points ($P_0$–$P_4$) in the program execution by storing the processor state and the memory content in at least all hardware initiated interrupt routines; by logging all operations against the peripheral units after each rollback point; by returning the program execution, after a changeover (at $P_f$) to a backup unit, to the last established rollback point ($P_1$); and by thereafter resuming the execution without performing any operations against the peripheral units, whereby instead the result of read operations is fetched from the log and write operations are skipped, until all the logged operations have been repeated; and by thereafter continuing the execution while performing operations against the peripheral units.

13 Claims, 12 Drawing Sheets

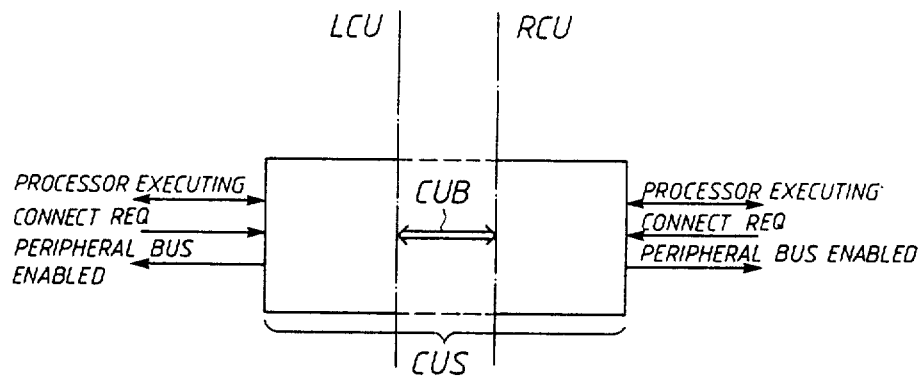
Fig. 8
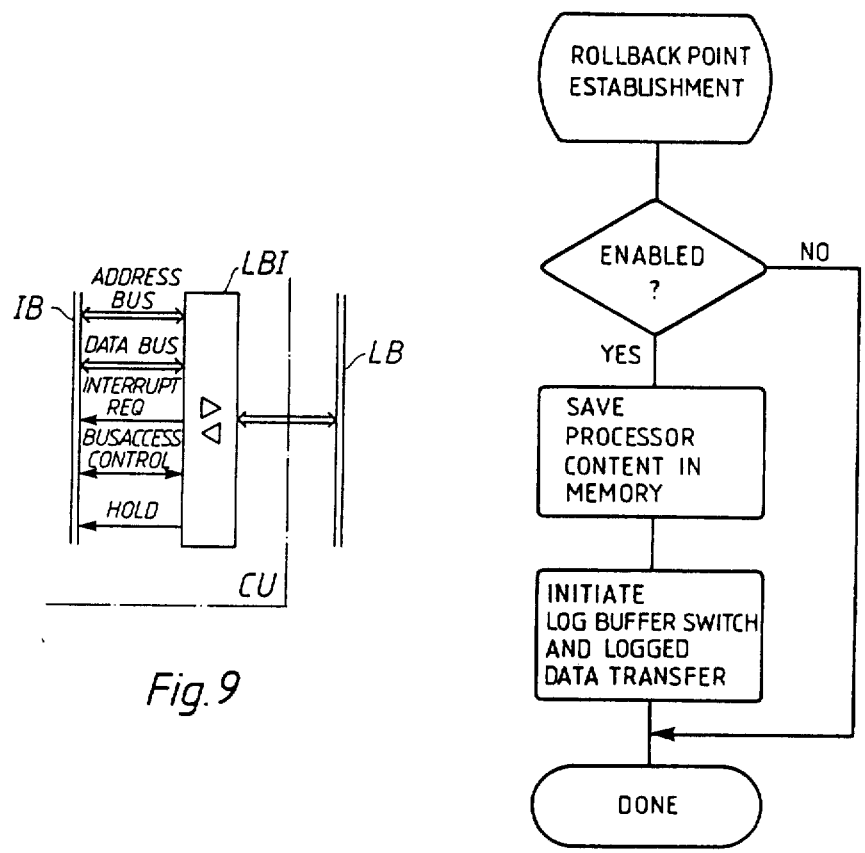
Fig. 9
Fig. 14

SYSTEM FOR BUMPLESS CHANGEOVER BETWEEN ACTIVE UNITS AND BACKUP UNITS BY ESTABLISHING ROLLBACK POINTS AND LOGGING WRITE AND READ OPERATIONS

TECHNICAL FIELD

The invention relates to a method in computer equipment for bumpless changeover of the function from active units to backup units in a central unit. The central unit has at least one processor, at least one memory, at least one redundant unit as backup unit for at least one of these units, and members for changeover of the function from an active unit to a backup unit. The processors are adapted for handling priority-based interrupt requests with the aid of interrupt routines, of which at least some are hardware initiated. Each interrupt routine has one entry point, at which the execution of the routine is started, and one interrupt acknowledgement point. Furthermore, the central unit is adapted to carry out write and read operations against peripheral units included in the computer equipment.

The invention also relates to computer equipment having members for carrying out the method.

The invention relates to methods and means in a central unit with one or more redundant processors and/or one or more redundant memories to bring about a bumpless switching of redundant units independently of the structure of the application program. The invention aims to provide a solution at the hardware and operating system level which can be applied to all computer systems but is particularly suitable in fault tolerant computer systems for process monitoring and process control in real time.

BACKGROUND ART

Process control is an application which requires higly reliable operation of the control system.

One method of increasing the reliability of a computer system is to introduce redundant components. Of special interest is the introduction of redundant components in the most vital part of the computer, the central unit. For this purpose and for switching in the components in a bumpless manner, i.e. without influencing the process control procedure, methods are required for establishing rollback points at short time intervals with a known central unit state, from which points the central unit can resume the program execution, and for handling interrupts and peripheral unit references.

One known method is to double the central unit and to update the computer base in the redundant central unit at checkpoints. These are selected such that the redundant unit is able to take over the function of the active unit by starting the execution of the program at the last checkpoint. In order to obtain a bumpless changeover, the checkpoints have to be selected such that the information therein is consistent. In computer systems with cyclically executing programs without interrupt handling, it is possible to enter a checkpoint after each program cycle and handle peripheral unit references such that each input or output is referred to once per program cycle at the most. This solves the problem in the limited case where the program for process monitoring and control is built up of sequentially executing modules, which execute at the same priority level. The method is described in U.S. Pat. No. 4,351,023.

The background of the invention is the development of increasingly more complex computer systems for monitoring and control of industrial processes in real time. These are characterized in that they are capable of handling interruptions from the process and in that the user programs are built up of two or more cooperating program modules which, independently of each other, execute in parallel but asynchronously at different priority levels. The program structures are defined by the user on the basis of requirements of each individual installation and vary from one plant to another. The difficulty in establishing rollback points in these computer systems resides partly in defining checkpoints in the program in which all dynamic data variables are consistent with each other, partly in handling the interrupts which, of course, result in the program execution taking place along non-predetermined paths, and partly in handling the peripheral unit references such that the state of the peripheral units is not affected by a reexecution of the program from the last rollback point, which would, of course, cause disturbance of the controlled process.

The present invention aims to provide a general solution to the problems associated with the introduction of redundant processors and memories in the central unit by suggesting methods that may be applied to all computer systems independently of the structure of the application program.

DEFINITIONS

The following terminology is used in the description:

By computer system is meant a complete computer with a central unit and input and output units of all kinds.

By central unit is meant a complete central unit with one or more processors and one or more memories.

By application program is meant that program which defines the task of the computer system.

By operating system is meant that program which administers the central unit and is execution of the application program.

By main program is meant that program, operating system + application program, which is required for carrying out the tasks of the computer system.

By backup program is meant a background program which is possibly executed by backup processors.

By primary units are meant active units in the central unit which take part in the execution of the main program carrying out the duties of the computer system.

By backup units are meant redundant units in the central unit. These can also take part in the execution of the main program in order thus to relieve the primary units, but they are not necessary for carrying out the duties of the computer.

By peripheral units are meant, on the one hand, the secondary memories of the computer equipment, i.e. members for storing programs and data which are not used in the execution in progress, and, on the other hand, the members of the computer equipment for communication with the surroundings, i.e. communication units, input units and output units.

By execution unit is meant an instruction sequence which is executed in one sequence. The execution units are delimited by checkpoints.

By rollback point is meant a point in the program at which processor state and memory contents are stored, and from which the program execution can be repeated.

By logging is meant an on-line recording of information, in this case of address and data exchanged between the units of the computer equipment. The information is recorded in a log buffer.

By memory reference is meant a write or a read operation in the memory, and by peripheral unit reference is meant a write or read operation against a peripheral unit.

By bumpless changeover is meant the disconnection of a primary unit and the connection of a backup unit to replace the primary unit, performed in such a way that it does not affect the behavior of the computer system other than by a short time delay introduced in a currently executing operation.

By hardware initiated interrupt routine is meant a program section which is executed by processor units in response to an asynchronously generated interrupt request by internal circuits, e.g. the interval clock, or a peripheral unit, e.g. a digital input card. The task of the interrupt routine is to investigate the cause of the interrupt and to initiate execution of an associated procedure. A processor unit may have an interrupt request input or several interrupt request inputs with different priorities.

SUMMARY OF THE INVENTION

The invention relates to methods and computer equipment for performing the methods of establishing rollback points and handling peipheral unit references and interrupts in a central unit such that the switching of redundant processors and memories becomes bumpless independently of the structure and configuration of the application program if an active unit should cease to operate owing to an error. The methods can be applied to all computer systems, but are particularly intended for computer systems having interrupt systems which execute one or more application programs for monitoring and control of processors in real time with requirements for highly reliable operation, in those cases where the application programs are built up of two or more cooperating program modules which, independently of each other, execute in parallel and asynchronously at different priority levels.

The methods are based on the fact that a computer can be regarded as a machine which, by executing a series of instructions in a program, passes through a number of states in which each state is completely determined by the preceding state and the instructions to be executed.

The principle is to divide the program dynamically into execution units and, at checkpoints between these units, to create rollback points with a save computer state, from which rollback points the program execution can be resumed, The dynamic division of the program into execution units is controlled by the interrupts such that checkpoints are activated when the program execution takes a new path because of an interrupt.

A rollback point is created by saving the states of the active processors and a copy of the content of the active memory. The program execution is resumed from a rollback point by restoring the states of the processors, and the program execution is resumed with the saved copy of the memory content.

To be able to re-execute a partially already executed execution unit without affecting the peripheral units, the peripheral unit references between rollback points are logged. During the re-execution the results of already performed peripheral unit references are utilized, instead of repeating the references. The result of read operations is fetched from the log and write operations are passed without taking any measures since they are already performed. In this way, the states of the peripheral units will not be affected by the re-execution other than by the time delay thus arising.

The invention is designed to be applied to a central unit with redundant processors and/or memories in order to restore the function of the central unit after a fault on a unit without affecting the function of the central unit.

BRIEF DESCRIPTION OF THE DRAWING

The invention will be described in the following with reference to the accompanying FIGS. 1-15, wherein

FIGS. 8-15 illustrate the invention as applied to equipment according to FIGS. 6-7;

FIG. 8 shows the central unit selector in block diagram form;

FIG. 9 shows a log bus interface unit;

FIG. 10 shows the organization of the memory;

FIG. 11 shows the configuration of the synchronization control unit;

FIG. 12 shows the configuration of the primary and backup unit operating systems;

FIG. 14 shows the flow diagram of the routine which establishes a rollback point at each checkpoint; and FIG. 15 shows a flow diagram of the routine for changeover from the primary unit to the backup unit.

DESCRIPTION OF THE PREFERRED EMBODIMENT

The invention is based on the principle of providing checkpoints in the program execution and to save at these points the states of the processor units and the memory units, enabling the state of the central unit to be restored. The memory content is saved in the simplest way in the redundant memory so that it is available immediately when needed. The memory content can be saved in different ways. One way is to make a copy of the entire memory at each checkpoint. A more efficient way is first make a copy and thereafter update the copy at each checkpoint with the changes. The states of the active processors, the processor status, can also be saved in different ways. One way is to have a special memory in a synchronization control unit. Another way is to save the processor status in the memory, thus having it saved automatically together with the memory content. When the processor status and the memory content are saved at the checkpoint, a rollback point is established from which the program can be executed over again in the same way in which it was executed the first time. However, a condition for a bumpless re-execution is that the surroundings of the central unit are not affected other than by the time delay thus arising. (By a suitable design, this time delay can be made very short.) This is achieved partly by delaying carrying out the interrupt acknowledgement until a rollback point has been established, and partly by saving the results of the peripheral unit references after each rollback point, so that they can be used again instead of being repeated upon a re-execution of the program section after the rollback point. The checkpoints are activated dynamically each time the program execution takes a new path because of the interrupt.

When a fault occurs in a processor or a memory, the faulty unit is disconnected, a redundant unit is connected to replace it, and the program execution is resumed from the last established rollback point. The processor restores its saved status and resumes the program execution with the saved memory copy. For each peripheral unit reference the processor investigates whether the reference has already been carried out, and if this is the case it uses the saved result instead of repeating the reference.

The solution is realized by means of a synchronization control unit, which continuously logs all write operations in the active memory and transfers these to the redundant memory at the checkpoints. The synchronization unit also logs all read and write operations between the checkpoints against the peripheral units and keeps the result of the operations after the last checkpoint available to the processor units for re-execution of the program.

Figure 1:
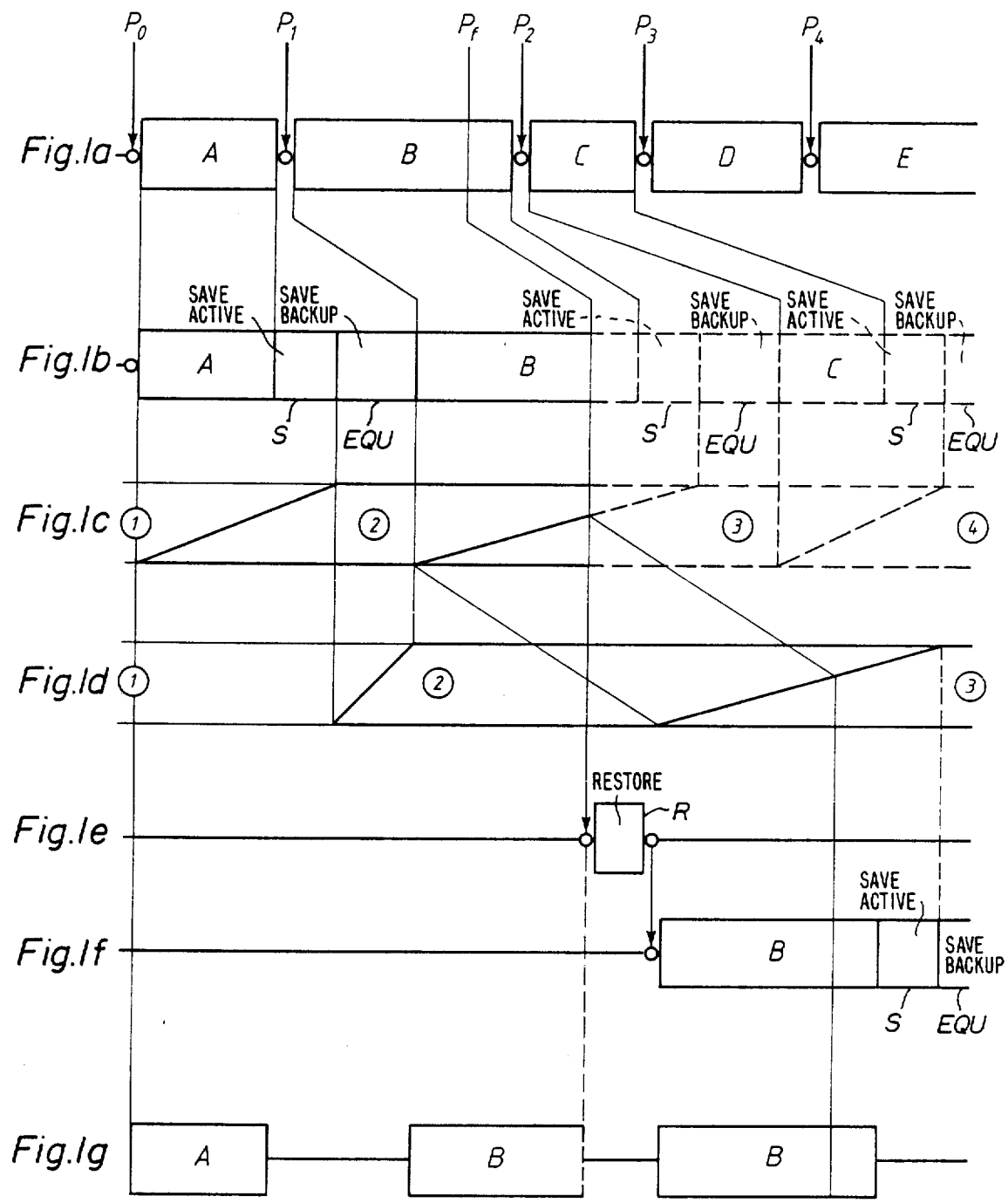
FIGS. 1(a) to 1(g) show the principle of the changeover according to the invention.
Figure 2:
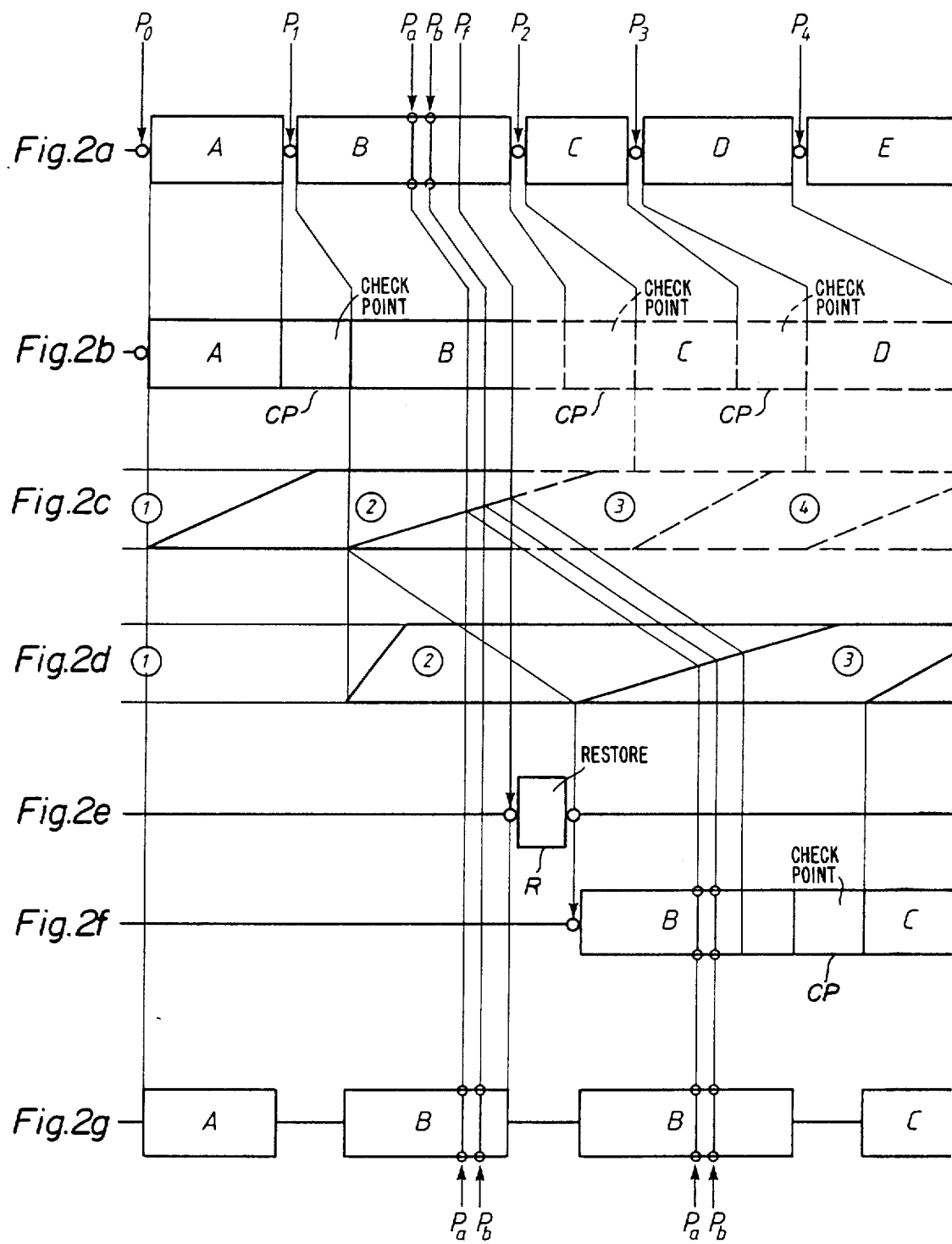
FIGS. 2(a) to 2(g) illustrate the problems with write operations against the peripheral units.

FIG. 1 shows schematically the mode of operation in computer equipment according to the invention. FIG. 1a shows an application program, which is divided into a sequence of execution units A, B, C, D, E, delimited by checkpoints, $P_0$–$P_4$. At each checkpoint, for example $P_1$, the state of the active processor is saved into the active memory, and then the content of the active memory is saved in the backup memory. Those operations are designated S and EQU, respectively, in FIG. 1b. FIG. 1c shows symbolically the change of the content of the active memory with time. This content is changed successively during the execution of the execution unit A and operation S from the initial state 1 to the final state 2. Following operation EQU, the state of the memory is then changed by execution of the unit B and the following operation S to the state 3, and so on.

FIG. 1d shows symbolically the states of the redundant memories. Prior to the execution of unit A, these memories at the checkpoint $P_0$ are updated so as to have the same state ("1") as that of the active memory. This state is maintained until operation EQU at checkpoint $P_1$. The operation EQU updates then the content of the redundant memory which thereby assumes the state 2.

At point $P_f$ a fault is assumed to occur in any of the active units. The fault is detected and initiates a transfer of the program execution from the active to the redundant units. This initiates a restoring procedure—"R" in FIG. 1e—which restores the program execution to the rollback point which was established at the immediately preceding checkpoint, in this case $P_1$. Thus, after the fault and the restoring procedure, the previously redundant units start the program execution at the beginning of the execution unit B (see FIG. 1f) and continue the execution in the same way as the previously active units.

FIG. 1g shows how the execution unit B, which up to the fault is executed by the active units, is resumed from the start by the redundant units.

Referring back to FIG. 1b, the operations S and EQU represent an overhead of the fault tolerant computer operations with respect to the same operations in a fault intolerant computer system. The overhead associated with the EQU operation might be particularly high if the whole active memory content is to be copied to the backup memory at each checkpoint. One way to reduce it is to copy the whole active memory content only once and afterwards to keep the backup memory content equalized to the active memory content by copying to the backup memory only those updates of the active memory which have been performed between the last and the current checkpoints. The implementation and further improvements of the suggested method are discussed in more detail below with reference to FIG. 11.

FIGS. 2a to 2g illustrate a problem which is solved by means of the invention. This figure corresponds to FIGS. 1a to 1g, but for simplicity the operations S and EQU at the checkpoints have been commonly designated CP. In execution unit B, at point $P_a$, a write operation is made against a peripheral unit, for example activating a digital output signal. At point $P_b$ a second write operation is made for deactivating the same digital output signal. After a fault in the active units, occurring at $P_f$, the execution is restored in the manner described above to the rollback point (established by checkpoint $P_1$) and with the aid of the redundant units a re-execution of unit B is started from the beginning of the unit. If no special measures were to be taken, the write operations would be carried out a second time, when points $P_a$ and $P_b$ are reached during the execution, i.e. one time more than desired. As mentioned, this problem is solved by logging peripheral unit references carried out between the rollback points and by not repeating them during a re-execution.

Figure 3:
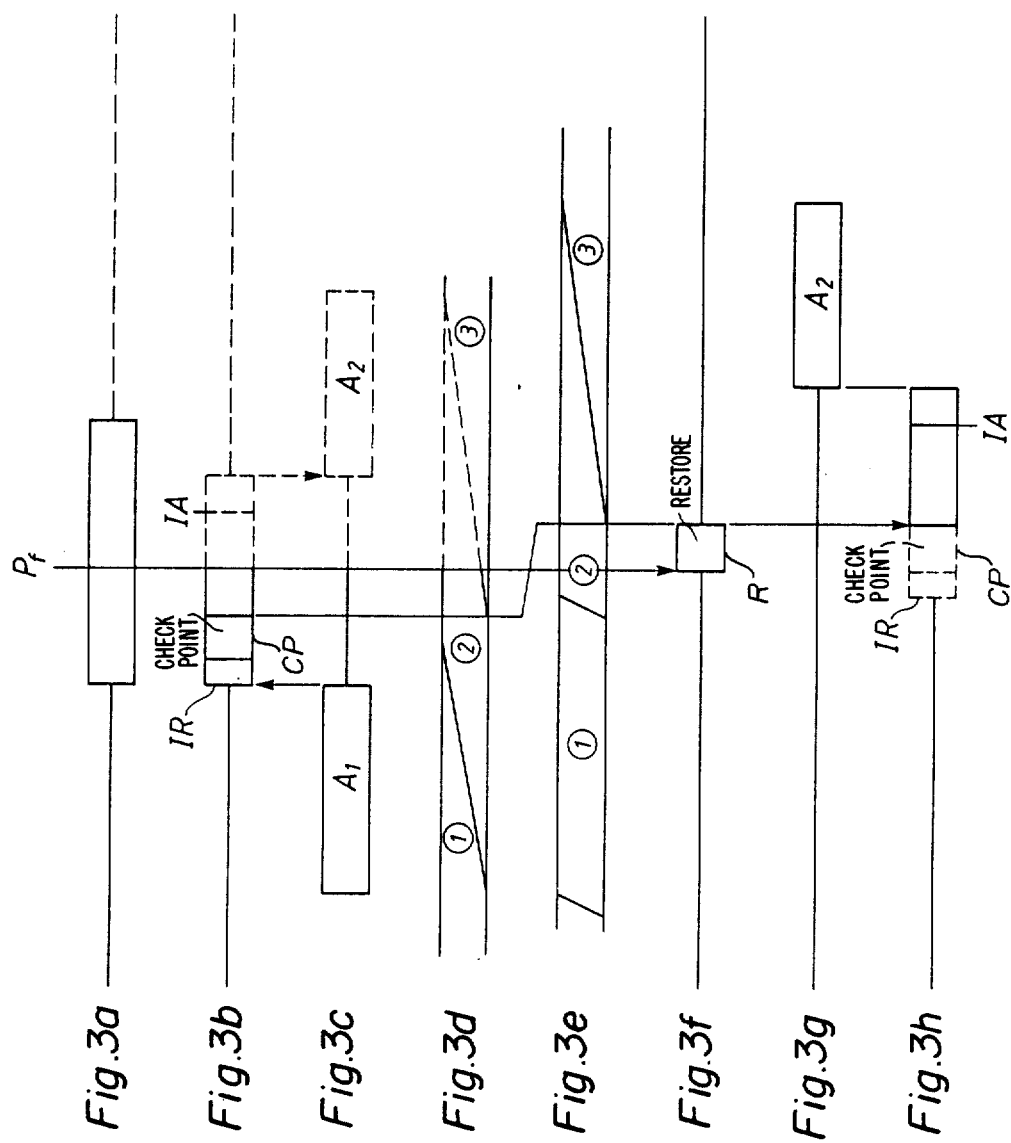
FIGS. 3(a) to 3(h) show the principle of interrupt handling according to the invention.

FIGS. 3a to 3h illustrate the handling of interrupts. FIG. 3a shows an interrupt request which occurs during the execution of a program unit A, the first part of which, A1, is executed prior to the interrupt (FIG. 3c). The checkpoint operation CP is inserted into the interrupt routine IR prior to those parts of the routine which contain peripheral unit references and the interrupt acknowledgement IA. In the event of a fault during the interrupt routine (at $P_f$), the execution of the main program is resumed at that rollback point which was established at the checkpoint by means of the restoring routine R (FIG. 3f), and the interrupt routine is re-executed from that point (FIG. 3h), whereafter the execution of the remaining part A2 of the unit A is carried out (FIG. 3g). FIGS. 3d and 3e show, in similar manner as in FIGS. 1c, 1d and 2c, 2d, the status of the active memories and the redundant memories, respectively. In this way, it is ensured that the interruption upon a fault in the active units is not lost and that the peripheral unit references can be retrieved in the proper order from the log during the re-execution.

Figure 4:
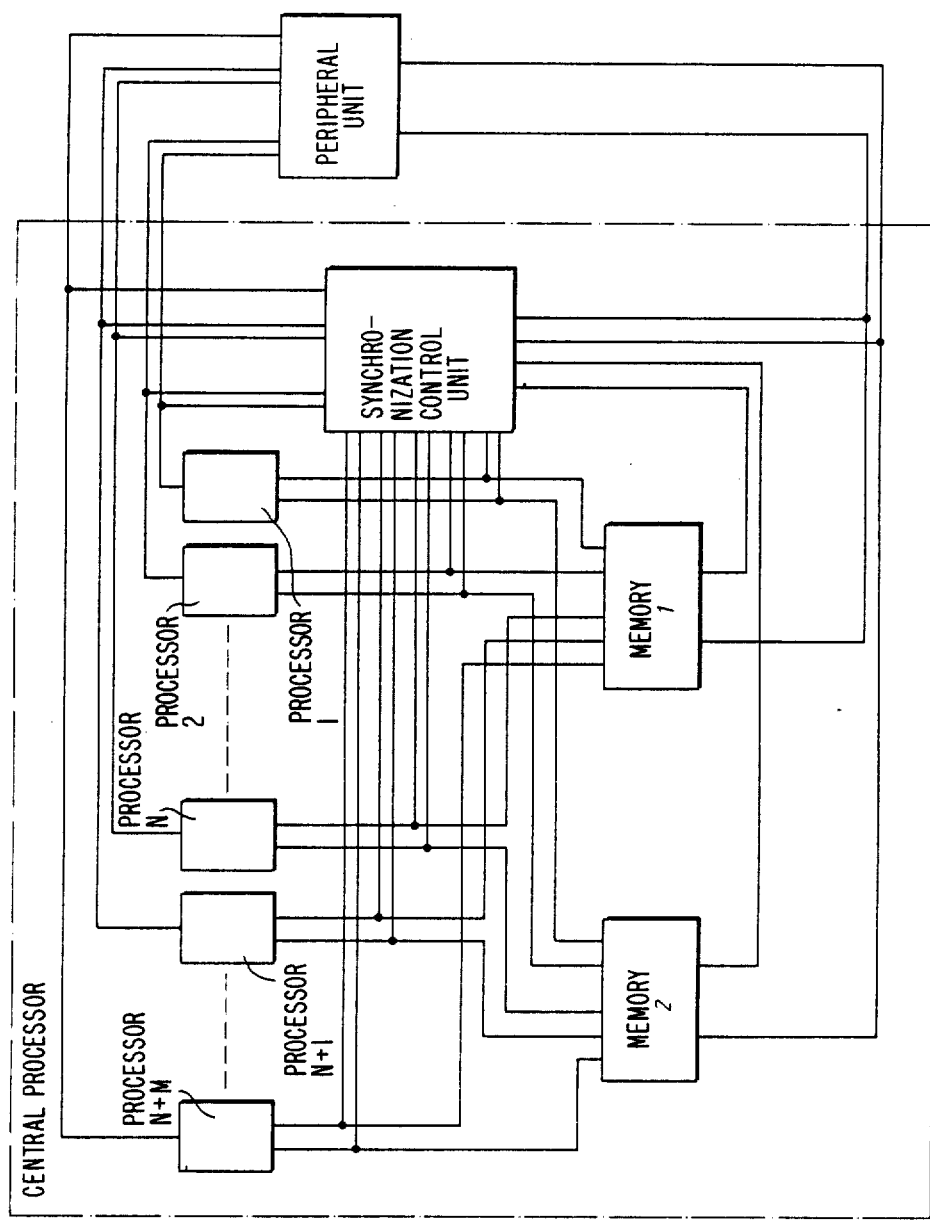
FIG. 4 shows a general computer equipment according to the invention.
Figure 5:
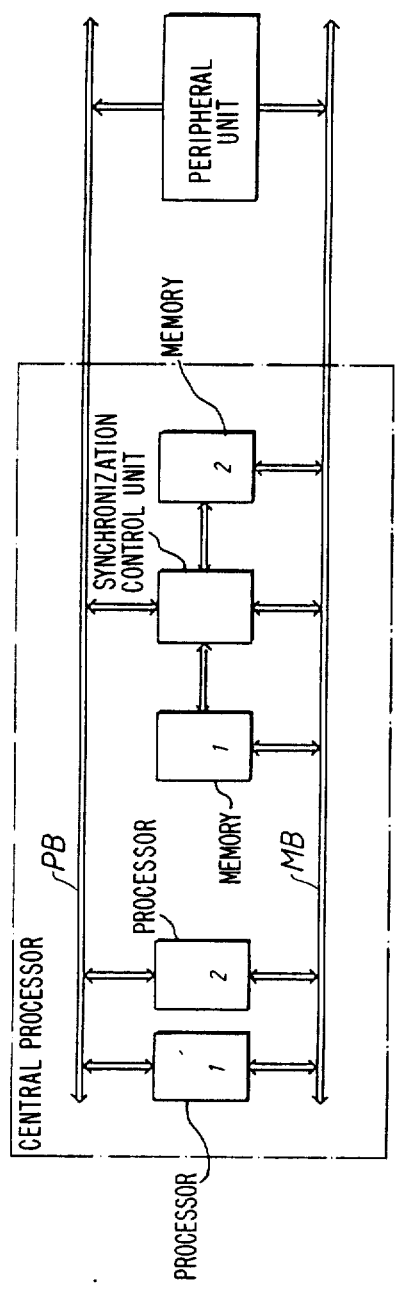
FIG. 5 shows equipment according to the invention having doubled processors and memories.
Figure 6:
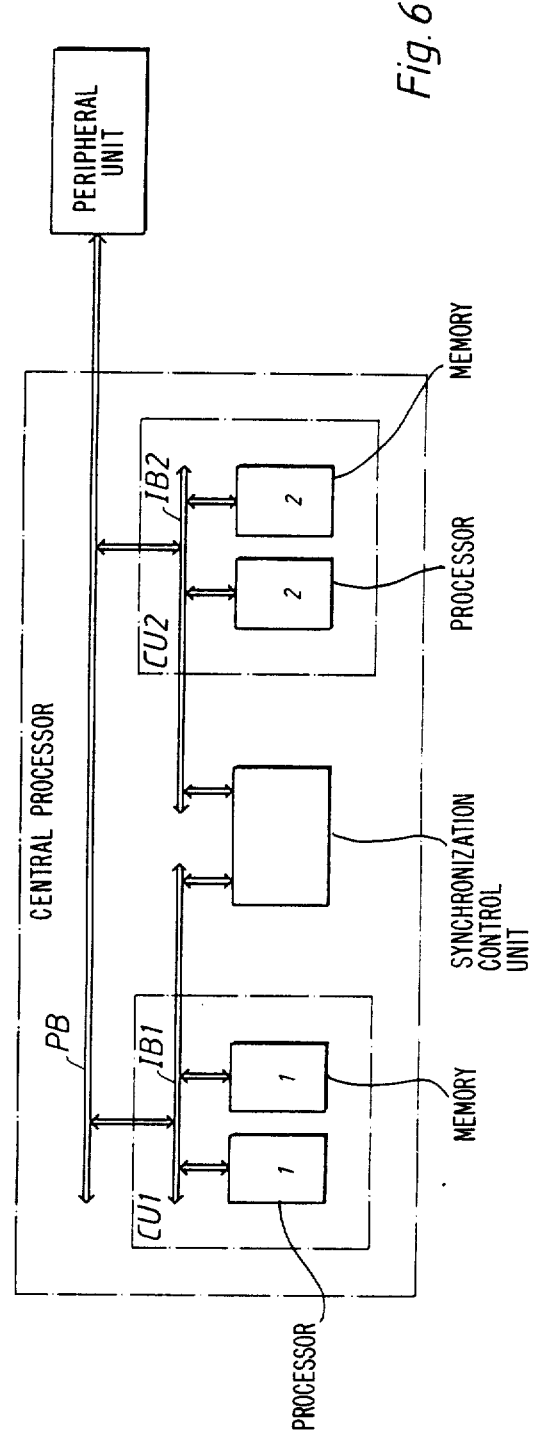
FIG. 6 shows equipment according to the invention having doubled central units.

FIG. 4, FIG. 5 and FIG. 6 show examples of the configuration of a central unit (CU) with redundant processors and memories. The synchronization control unit (SCU) is a device which saves the states of the active processors and a copy of the active memory and which logs peripheral unit references.

FIG. 4 shows a general CU with an arbitrary number of active processors PROC 1 ... PROC N, which take part in the execution of the main program, and an arbitrary number of redundant backup processors, PROC N+1 ... PROC N+M. It has two memories, MEM 1 and MEM 2, one being active and the other redundant. Each one of the processors is connected to both memories. All the units are connected to the synchronization unit which monitors and records memory updates and peripheral unit references originating from any one of the active processor units and which transfers updates of the active memory to the redundant memory on a per processor basis. In the case of active processor failure, the failed processor is replaced by one of the backup processors and operation of N active processors is rolled back to their corresponding rollback points. During program reexecution the synchronization unit is responsible for providing each processor with only those peripheral references which have been previously executed by the same processor. (In the case of the newly activated processor with references originating from the failed processor.)

In the case of active memory failure, the operation of all N active processors is stopped, the failed memory is replaced by the backup memory, and then the operation of each processor is rolled back to its corresponding rollback point.

FIG. 5 shows an embodiment of a CU with two processors PROC 1 and PROC 2, one of which is active and the other redundant, and with two memories MEM 1 and MEM 2, one of which is active and the other redundant. The signal paths between the units in the CU, and between this and the peripheral units PU, are formed as a peripheral bus PB and a memory bus MB.

FIG. 6 shows another embodiment of a CU, which comprises two complete central units CU 1 and CU 2 and a synchronization control unit SCU. Each CU has an internal bus—IB 1 and IB 2, respectively—which also connects the CUs to the SCU. A peripheral bus connects the central units to the peripheral units PU.

The embodiments shown are only examples of the configuration of equipment to which the invention can be applied.

The embodiment which will be described below is based on a central unit configuration according to FIG. 6. In this solution the synchronization unit saves the copy of the active memory in the redundant memory so that it is available immediately after a changeover. Also the processor state is saved in the redundant memory, whereas the peripheral unit references are saved in the log buffer.

Figure 7:
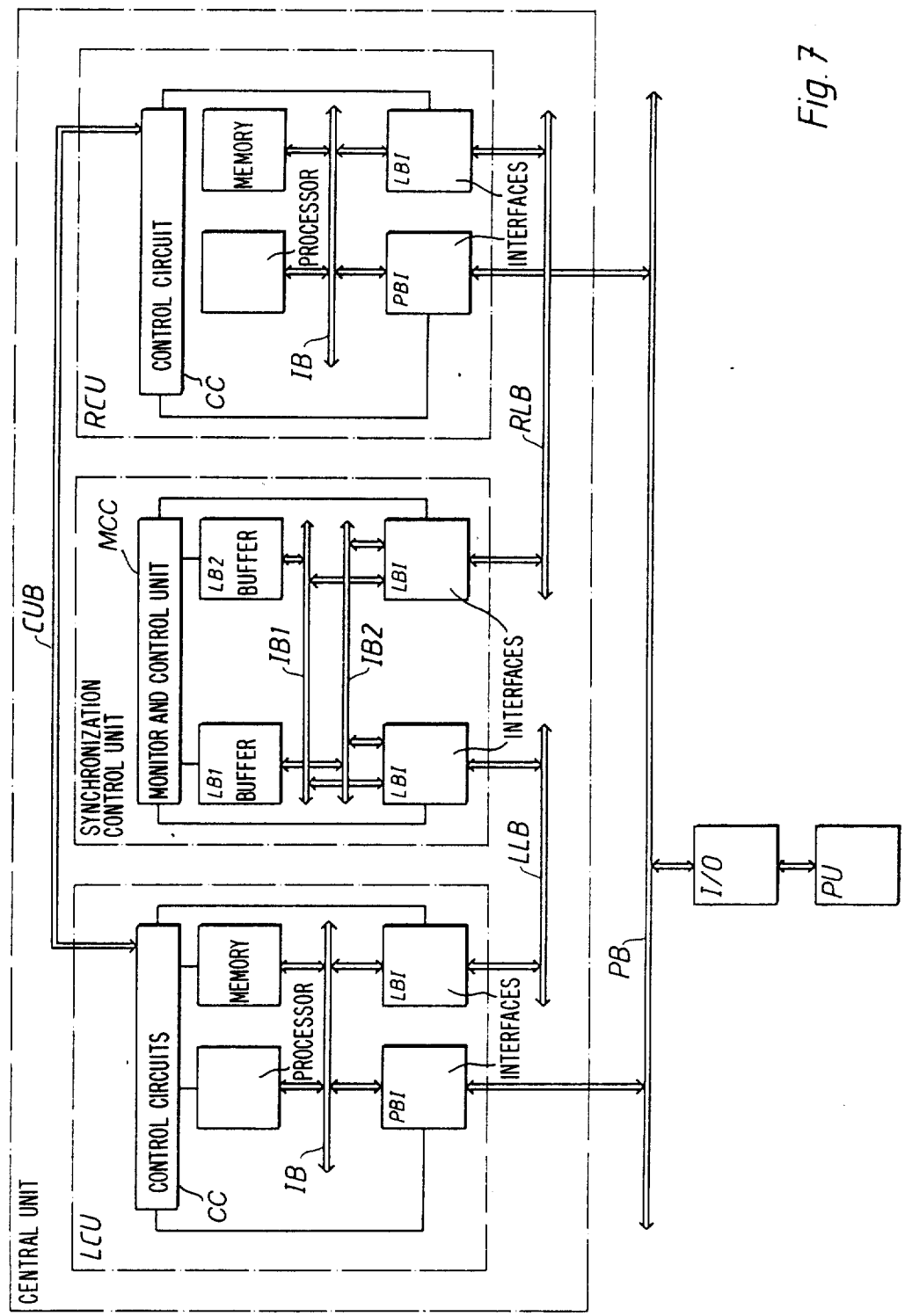
FIG. 7 shows in more detail equipment according to FIG. 6.

FIG. 7 shows a more detailed block diagram.

The central unit, CU, consists of two identical central units, LCU and RCU, and a synchronization control unit, SCU. Each central unit has a processor, PROC, and a primary unit, MEM, and associated control circuits, CC. The central unit accomodates an internal bus, IB, which operates both as a signal path to the memory and as (internal) signal path to the peripheral units. The internal bus communicates with the (external) peripheral bus and the log bus via the controllable interfaces PBI and LBI, respectively. A central unit bus, CUB, connects the two central units.

The central units are designed so that one, and only one, of them is connected to the external peripheral bus.

The SCU is reversible and the central units are designed so that any one of them can be the active, e.g. primary unit with the other one as the backup unit.

The SCU logs the write operations of the primary unit in the primary memory of the primary unit and updates the primary memory of the backup unit and logs the peripheral unit references.

The SCU has two log buffers LB 1 and LB 2, two internal buses IB 1 and IB 2 and interface units LBI for communications between the SCU and the central unit via the log buses LLB and RLB.

In addition, it has a monitoring and control circuit MCC.

The central unit is adapted to the redundancy function as follows:

It has a controllable interface to the external peripheral bus (PBI in FIG. 7) which is formed so that one, and only one, central unit is always connected to the peripheral bus, and a central unit selector (CUS). The CUS (FIG. 8) is a circuit which comprises the two central units and constitutes parts of the control circuits CC of the units. When a central unit has established that it can and should operate as a primary unit, it activates the signal CONNECT REQ. That central unit which activates the signal first becomes the primary unit by activating the signal PERIPHERAL BUS ENABLED. If both central units should activate CONNECT REQ. at the same moment, the choice is made by that position which is assumed by a bistable flip-flop in the CUS upon energizing. With the aid of the signals PROCESSOR EXECUTING, the central units signal to each other if they execute programs.

It has an interface between the internal bus and the log bus (LBI in FIG. 7) which is described in more detail in FIG. 9. In addition to address and data lines (ADDRESS BUS and DATA BUS, respectively), the interface also comprises lines for interrupt generation (INTERRUPT REQ.), direct memory access from the SCU (BUS ACCESS CONTROL), and stop of execution (HOLD).

Figure 10:
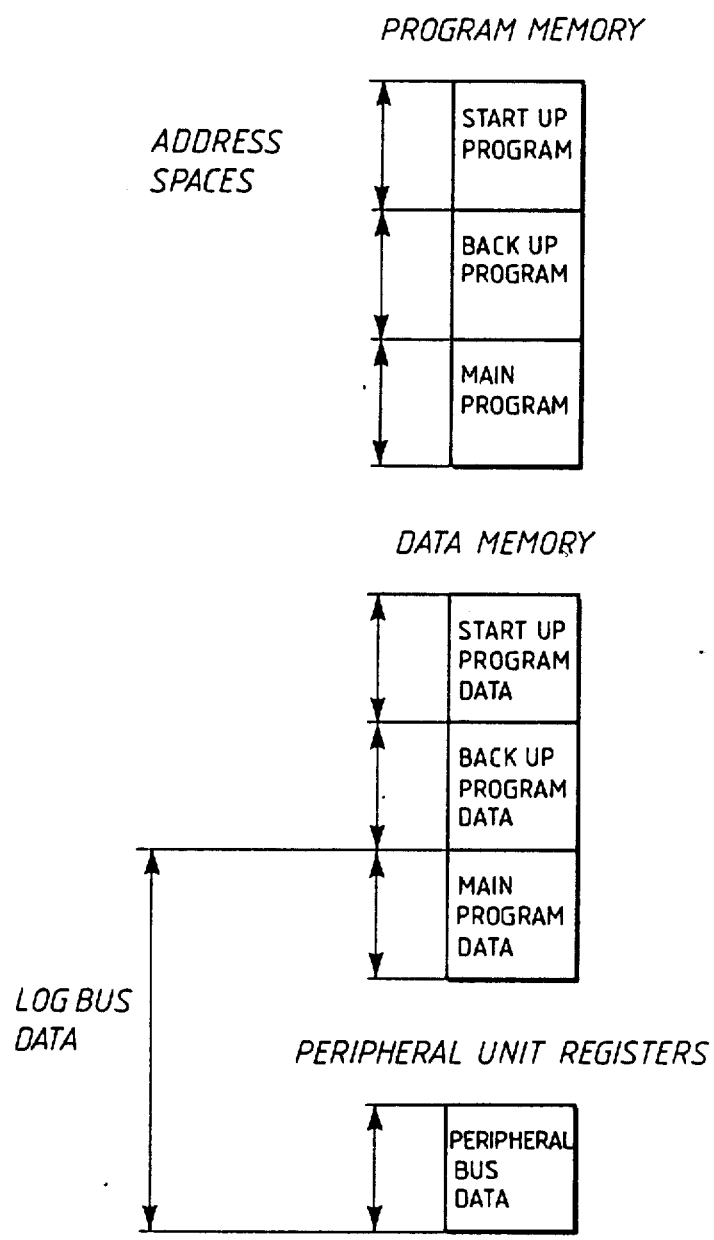

The memory is organized in address spaced according to FIG. 10. The PROGRAM MEMORY is organized in three ADDRESS SPACES for the STARTUP PROGRAM, the BACKUP PROGRAM, and the MAIN PROGRAM, respectively. The DATA MEMORY is organized in three corresponding address spaces.

In addition, there is an address space for peripheral bus data (PERIPHERAL UNIT REGISTER). The log bus interfaces on the SCU have an address space decoder which selects main program data and peripheral bus data for logging (LOG BUS DATA).

When the central unit is the primary unit it executes the main program and carries out the duties of the computer, and when it is the backup unit it executes the background program and supervises the primary unit. The SCU maintains a copy of the data of the main program at the last rollback point in the backup unit.

Figure 11:
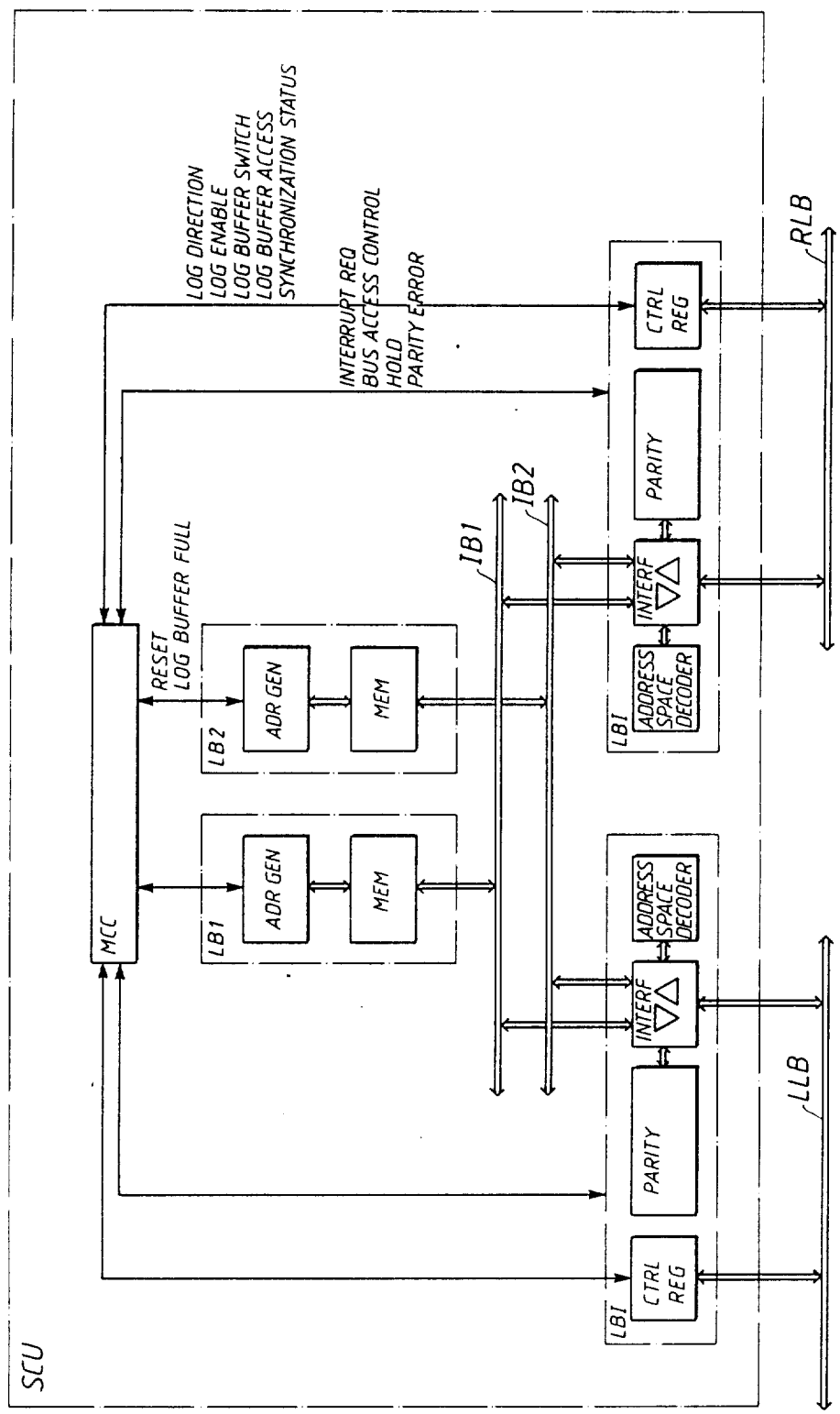

FIG. 11 shows in more detail the configuration of the SCU.

The function of the SCU is to record, store and transfer synchronization information between the primary unit and the backup unit, and to record and store information about the operations of the primary unit against the peripheral bus.

The main components of the SCU are the log buffers LB 1 and LB 2. The SCU can be designed with an arbitrary number of log buffers operating cyclically according to a rolling scheme, in which data are logged in recording cycles controlled by the checkpoint activations, and the data transmissions to the backup unit take place asynchronously and in parallel with the recordings and are controlled only by the duration of the transmission and the supply of filled log buffers. The described solution has two buffers operating alternately.

Each log buffer has a data memory (MEM) and an address generator (ADR GEN). The log buffers can be connected, via the controllable bus interface circuits LBI, to the internal busses of the central units via the log busses LLB and RLB. The log buffers and the bus interface circuits are controlled by monitoring and control circuits MCC for activation/deactivation of the logging function and for buffer switching at the checkpoints. The MCCs, in turn, are controlled by the central units via control registers in the bus interface circuits (CTRL REG).

The bus interface circuits LBI also contain units (PARITY) for parity bit generation and control, circuits (INTERF) for adaptation of the signals, and an ADDRESS SPACE DECODER.

When a checkpoint is enabled, the primary unit interrupts the execution of the main program, records its processor state in the memory and orders a buffer switching via the control register. The MCCs in the SCU then perform the following function (assuming that data have been logged in LB 1):

The primary unit is stopped by activating HOLD against it.

If the transfer of the data from LB 2 to the backup unit is not completed, this is completed.

The connections of the internal busses to the log bus interfaces are changed.

The address generator of LB 2 is set to zero, HOLD against the primary unit is deactivated and logging of data in LB 2 is initiated. Thereafter, the logging takes place continuously by intercepting addresses and data on the internal bus of the primary unit and recording them in the log buffer. After each logging, the address generator steps one step forward and points at the next cell in the buffer until a buffer switching is initiated at the next checkpoint. In case of a certain buffer address, indicating that the buffer is full, the address generator generates an interruption to the primary unit for activation of a new checkpoint.

Data transmission from LB 1 to the backup unit is initiated at the moment that HOLD against the primary unit is deactivated. Thereafter, the transfer is carried out utilizing a "direct memory access" such that primary memory data in the log buffer are transferred to the corresponding addresses in the backup unit memory.

The unit is reversible, i.e. designed in such a way that anyone of the central units may function as primary unit and the other one as backup unit.

Figure 12:
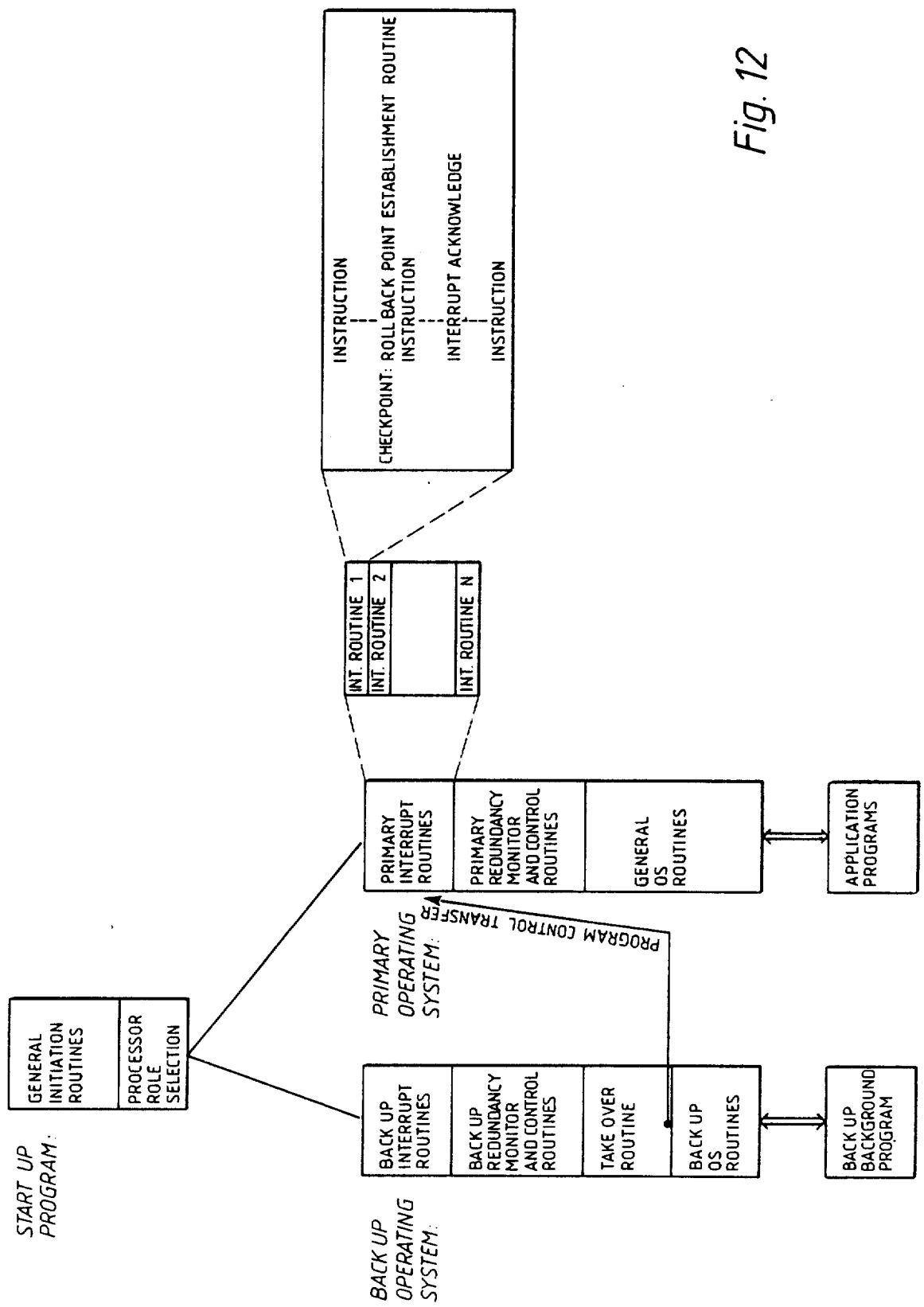

FIG. 12 shows the configuration of the operating system.

The operating system, the function of which is to administer the central unit and its execution of the application program, is adapted to the redundancy function by being divided into three sub-programs and being supplemented with routines for monitoring of active and redundant units and monitoring and control of the synchronization of the redundant units with the active ones as well as switching between them.

The operating system consists of the following sub-programs:

The STARTUP PROGRAM, which comprises routines for initiation of the central unit (GENERAL INITIATION ROUTINES) and selection between primary function and backup function (PROCESSOR ROLE SELECTION). The selection is made in conjunction with the other central unit via the SCU in FIG. 8 starting from the status of the central units and the settings of the operator. If the central unit is to become the primary unit, the continued program execution control is transferred to a primary operating system, and if it is to become the backup unit, the control is transferred to a backup operating system.

The PRIMARY OPERATING SYSTEM, which comprises interrupt routines, PRIMARY INTERRUPT ROUTINES, each one with a checkpoint at which a rollback point is established by the ROLLBACK POINT ESTABLISHMENT ROUTINE; routines for monitoring the backup unit and monitoring and control of the SCU and the synchronization process, PRIMARY REDUNDANCY MONITOR AND CONTROL ROUTINES (see flow diagram in FIG. 13a); as well as general operating system routines for administration of the primary unit, handling of the peripheral units and execution of the application program, GENERAL OS ROUTINES. The APPLICATION PROGRAMS execute under the control of this operating system.

Figures 13A, 13B:
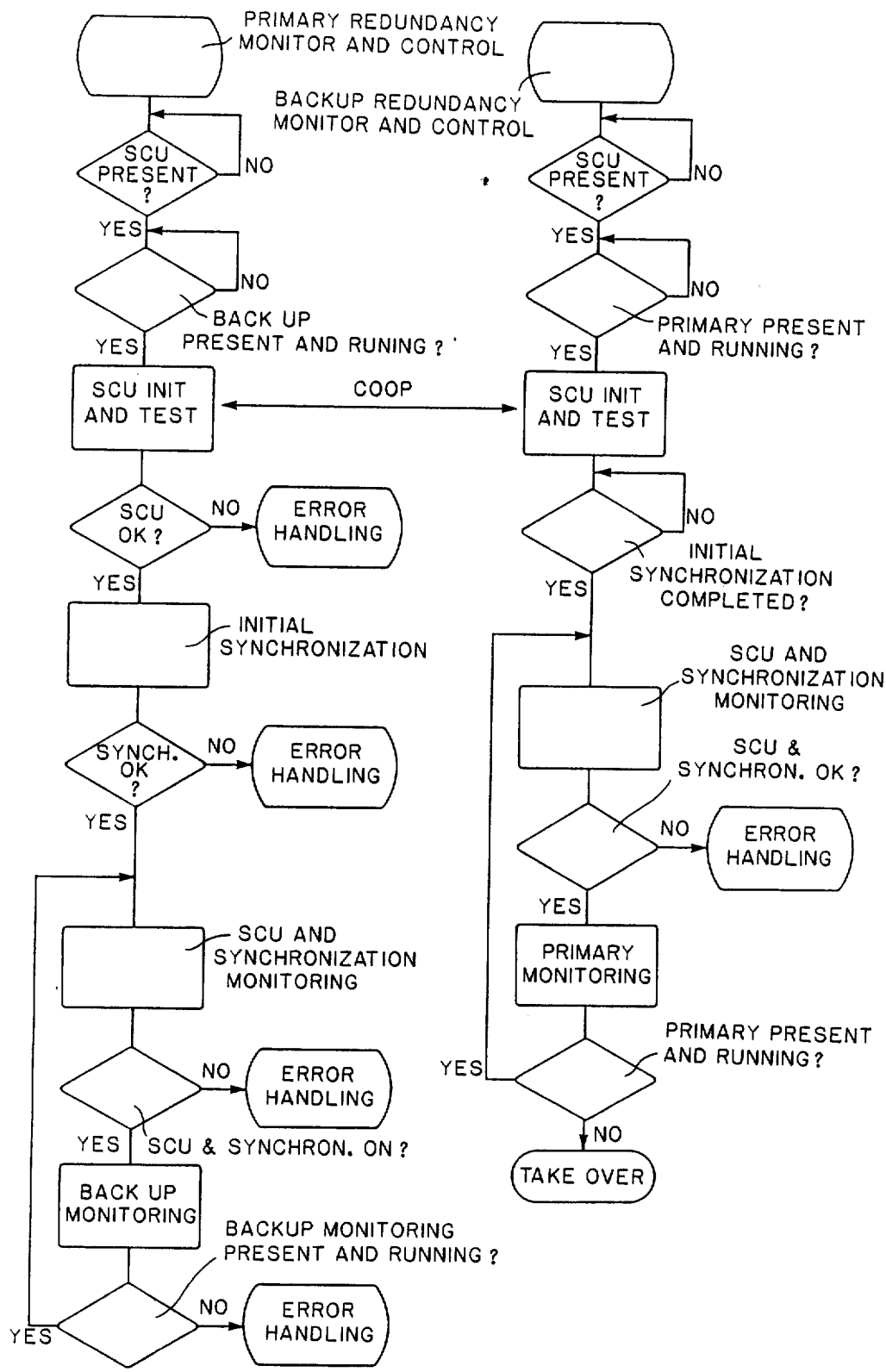
FIGS. 13a and 13b show flow diagrams of the routines of the primary unit and secondary unit operating systems, respectively, for monitoring the backup unit and primary unit, respectively, and for monitoring and control of the synchronization control unit and the synchronization process.

The BACKUP OPERATING SYSTEM, which comprises BACKUP INTERRUPT ROUTINES; routines for monitoring of the primary unit and monitoring and control of the SCU and the synchronization process, BACKUP REDUNDANCY MONITOR AND CONTROL ROUTINES (see flow diagram in FIG. 13b); TAKEOVER ROUTINES which switch between the central units; as well as routines for administration of the backup unit and its program execution, BACKUP OS ROUTINES. The BACKUP BACKGROUND PROGRAM executes under the control of this operating system.

The interrupt routines, PRIMARY INTERRUPT ROUTINES, of the primary operating system are shown in more detail on the righthand side of FIG. 12. They comprise N interrupt routines, INTERRUPT ROUTINE 1 through INTERRUPT ROUTINE N. Each one of these comprises a number of instructions, INSTRUCTION, which among other things include a CHECKPOINT, in which the ROLLBACK POINT ESTABLISHMENT ROUTINE is called, as well as an instruction or routine for acknowledgement of the interrupt (INTERRUPT ACKNOWLEDGE).

Within each interrupt routine no peripheral unit references occur ahead of the checkpoint.

FIG. 13a shows in the form of a flow diagram the routines of the primary operating system for monitoring of the backup unit and for control and monitoring of the SCU and the synchronization process (PRIMARY REDUNDANCY MONITOR AND CONTROL). FIG. 13b shows the corresponding routines of the backup operating system. After checking that the SCU is connected (SCU PRESENT?) and that the backup and primary units are connected and functioning (BACKUP PRESENT AND RUNNING?), the two operating systems cooperate (symbolized by the arrow COOP) in carrying out an initiation and testing of the SCU (SCU INIT AND TEST). If the unit operates correctly (SCU OK?), the primary operating system carries out an initial total synchronization (INITIAL SYNCHRONIZATION). If this has been correctly completed (SYNCH. OK?), the routines of the two operating systems change into a closed loop with a supervising function (SCU AND SYNCHRONIZATION MONITORING and BACKUP/PRIMARY MONITORING, respectively). If the SCU does not function correctly, the two operating systems initiate an error handling routing (ERROR HANDLING).

The backup operating system monitors the primary unit (PRIMARY PRESENT AND RUNNING?) and, in the event of an error therein, initiates a TAKE OVER routine which causes the backup unit to take over the execution of the main program at that rollback point which is established at the last checkpoint. The primary operating system monitors the backup unit (BACKUP MONITORING) and, in the event of an error therein, initiates an ERROR HANDLING routine.

The synchronization process creates a series of rollback points by transferring the data image of the main program of the primary unit, and the processor state associated with that image, to the backup unit at checkpoints.

The first rollback point is established by an initial total synchronization (INITIAL SYNCHRONIZATION), and subsequent stepwise resynchronizations establish new rollback points at the subsequent checkpoints. Between two checkpoints, the SCU logs all changes in the data image of the main program of the primary unit, and at the checkpoints it updates the corresponding data image in the backup unit. The primary processor state belonging to the memory image is transferred to the backup unit by the processor saving its state in the data image before the transfer of the loggings is initiated. During the initial total synchronization, a program in the primary unit runs through the data memory of the main program and reads/rewrites each memory cell. Each write operation is logged and transferred at the next checkpoint to the backup unit, so when the program has run through the entire memory, also its content has been transferred to the backup unit, thereby establishing the first rollback point. At the subsequently located checkpoints new rollback points are established by updating the memory of the backup unit and the processor state belonging to the backup unit, so that the memory of the backup unit again corresponds to that of the primary unit.

FIG. 14 shows the flow diagram for the routine (ROLLBACK POINT ESTABLISHMENT) that is executed at each checkpoint. The routine first checks whether the synchronization is active (ENABLED?). Thereafter the routine saves the processor state in the data image of the main program (SAVE PROCESSOR CONTENT IN MEMORY), and finally the routine initiates changeover to a new log buffer and transfer of logged data to the backup unit (INITIATE LOG BUFFER AND LOGGED DATA TRANSFER).

Figure 15:
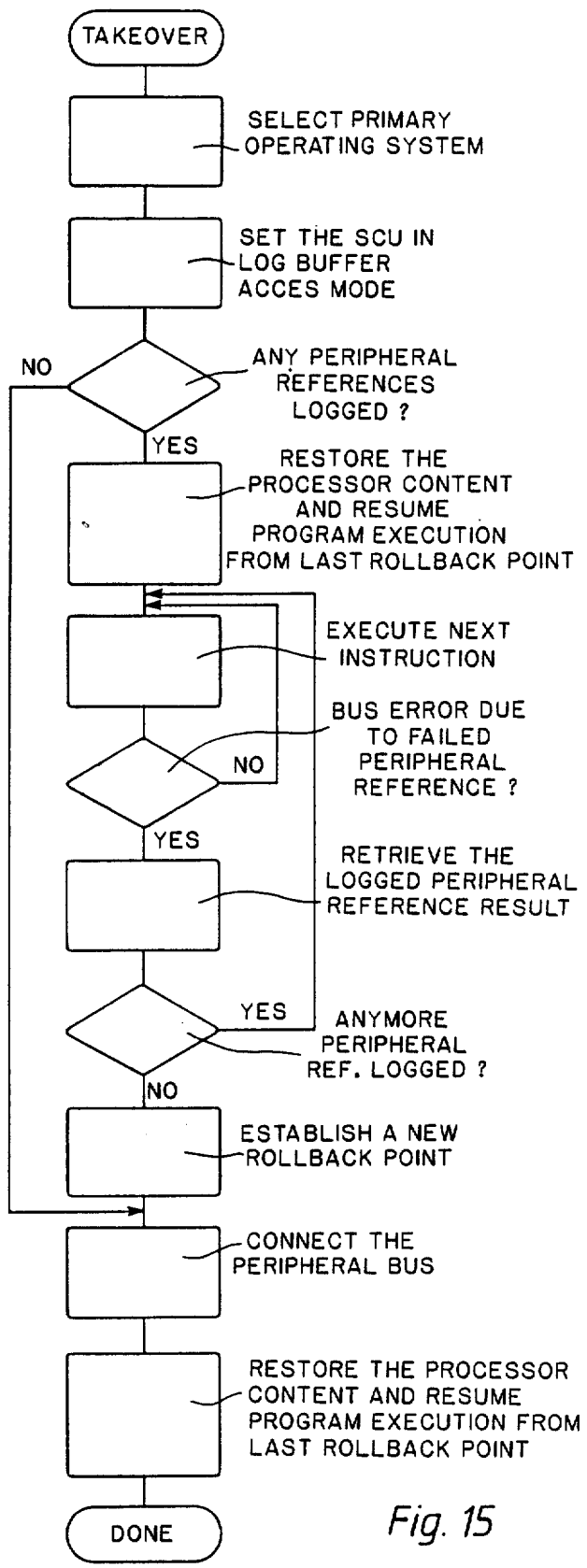

When an error is detected in the primary unit, its program execution is interrupted and it is disconnected from the peripheral bus. Now, the backup unit is to take the place of the primary unit and become the new primary unit. The backup unit has a copy of the data image of the main main program of the old primary unit, taken at the last rollback point, which includes the processor state belonging to this data image, and the SCU has all peripheral unit operations after the checkpoint recorded in a log buffer. The backup unit detects when the primary unit is disconnected and activates the TAKE OVER routine. A flow diagram of this routine is shown in FIG. 15.

The TAKE OVER routine first switches the backup unit to the primary unit by selecting the primary operating system (SELECT PRIMARY OPERATING SYSTEM). The next step is to switch the log buffers in the SCU so that it has access to the last one (SET THE SCU IN LOG BUFFER ACCESS MODE), and to investigate the content therein to see whether there are any peripheral unit references recorded (ANY PERIPHERAL REFERENCES LOGGED?). If this is the case, the peripheral bus is not connected immediately but the program is re-executed from the rollback point (RESTORE THE PROCESSOR CONTENT AND RESUME PROGRAM EXECUTION FROM LAST ROLLBACK POINT) until all logged peripheral unit references have been passed, and for each peripheral unit reference that gives rise to a "bus error", owing to the peripheral bus not being connected, the result is retrieved from the log buffer. Data from read operations are read from the log buffer, and write operations, which are already carried out, are skipped. When there are no more peripheral unit references in the log buffer, a new rollback point is established (ESTABLISH NEW ROLLBACK POINT), the peripheral bus is connected (CONNECT THE PERIPHERAL BUS), and the execution of the main program is resumed from the last established rollback point (RESTORE THE PROCESSOR CONTENT AND RESUME PROGRAM EXECUTION FROM LAST ROLLBACK POINT).

I claim:

1. In computer equipment, a method of bumpless changeover of function from active units to backup units in a central unit, the central unit having at least one active processor, at least one active memory, at least one redundant unit as a backup unit for at least one of said active units, and members for effecting the changeover of the function from an active unit to a backup unit, the processor handling interrupts with the aid of interrupt routines of which at least some are hardware initiated, each of the interrupt routines having one entry point, where the execution of the routine is started, and one interrupt acknowledgement point, the central unit effecting write and read operations against peripheral units included in the computer equipment, wherein the method comprises the following steps:

(a) establishing successive rollback points by the active processor during program execution, in at least all hardware initiated interrupt routines between the entry point and the interrupt acknowledgement point, by storing status of the active processor and at least contents of those parts of the active memory which have been modified by the active processor;

(b) logging said write and read operations against the peripheral units after each rollback point;

(c) after changeover of the function from an active unit to a backup unit, returning the program execution to the last established rollback point by restoring the contents of the active memory and the status of the active processor to the respective contents and status established by a corresponding unit previously active at said rollback point, whereafter resuming the program execution without carrying out any write and read operations against the peripheral units;

(d) during the following program execution, fetching the results of the read operations already performed against the peripheral units from the log until all logged operations have been repeated; and (e) continuing the program execution while carrying out operations against the peripheral units.

2. A method according to claim 1, wherein the status of a processor, when establishing a rollback point, is stored by first storing it in the active memory and thereafter storing it in a second memory together with the contents of said parts of the active memory.

3. A method according to claim 1, wherein the contents of said parts of the active memory are stored in a backup memory.

4. A method according to claim 2, wherein the contents of said parts of the active memory are stored by a process comprising the steps of:

logging changes in cells of active memory between two consecutive rollback points simultaneously with the program execution; and initiating transfer of the logged changes to the corresponding cells in the second memory at each rollback point.

5. A method according to claim 4, wherein the transfer of the logged changes to the second memory is carried out simultaneously with and independently of the logging of the subsequent changes in the active memory, thereby establishing the execution of the program to be continued from the rollback point without any delay pending the completion of the transfer.

6. A method according to claim 4, wherein a first copy of the contents of the active memory is saved in the second memory, thereby establishing the first rollback point, by a process comprising read/write operations of each cell in the active memory in which each read/write operation is carried out in an indivisible memory reference operation.

7. A method according to claim 1, further comprising the steps of:

determining that a fault has occurred in the active memory;

disconnecting the faulty memory;

connecting a backup memory;

returning the program execution of a processor to the last rollback point; and resuming the program execution from the rollback point;

thereby recovering the central unit after a fault has occurred in the active memory.

8. A method according to claim 1, further comprising the steps of:

determining that a fault has occurred in the active processor;

disabling the faulty processor;

transferring the functions of the faulty processor to a backup processor;

switching to a backup memory;

returning the program execution of the active processor to the lost rollback point; and resuming the program execution from the rollback point;

thereby recovering the central unit after a fault has occurred in the active processor.

9. In a computer equipment having a central unit wherein bumpless changeover of function from active units to backup units take place, the central unit having at least one active processor for handling interrupts with the aid of interrupt routines of which at least some are hardware initiated and have an entry point in which the execution of the routine is started and an interrupt acknowledgement point, the central unit further including at least one active memory, at least one redundant unit as a backup unit for at least one of said active units, and members for effecting changeover of the function from an active unit to a backup unit, the central unit effecting write and read operations against peripheral units included in the computer equipment, wherein the computer equipment further comprises:

(a) members for establishing successive rollback points for the active processor during program execution by storing, in at least all hardware initiated interrupt routines between the entry point and the interrupt acknowledgement point, status of the active processor and at least contents of those parts of the active memory which have been modified by the active processor;

(b) members for logging said write and read operations against the peripheral units after each rollback point;

(c) members, connected to said storing members, for returning the program execution to the last established rollback point, after changeover of the function from the active unit to the backup unit, by restoring the contents of the active memory and the status of active processor to the respective contents and status established by a corresponding unit previously active at said rollback point, and thereafter for resuming the program execution without carrying out any write and read operations against the peripheral units; and (d) members, connected to said logging members, for fetching, during the following program execution, results of read operations already performed against the peripheral units from the log until all logged operations have been repeated, and thereafter to continue the program execution while carrying out operations against the peripheral units.

10. Computer equipment according to claim 9, wherein the central unit includes a redundant processor unit, the computer equipment further comprising:

members for selecting between an active function and a backup function of the processors of the central unit and for causing, in case of an active function of a processor, said processor to carry out the function of the computer by executing programs and carrying out operations against the peripheral units;

members for connecting a processor having an active function to the peripheral units to make it the active processor and for disconnecting a processor having a backup function from the peripheral units to make it a backup processor; and members for disconnecting said active processor and connecting said backup processor when a fault is detected in said active processor.

11. Computer equipment according to claim 9, wherein the central unit includes a redundant memory, the computer equipment further comprising:

members for selecting between an active function and a backup function of the memories of the central unit and for causing, in case of an active function, a memory to be referred to continuously when programs are being executed by the active processor;

members for connecting an active memory to and for disconnecting a backup memory from the active processor; and members for disconnecting said active memory from and for connecting said backup memory to the active processor when a fault in said active memory is detected.

12. Computer equipment according to claim 9, further comprising:
   a first buffer memory for connecting via a signal path to said active memory for logging write operations therein, the first buffer memory further connecting via another signal path to a backup memory for transfer of the logged memory operations to corresponding cells therein; and
   a second buffer memory for connecting via a further signal path to the peripheral units for logging read and write operations against the same, the second buffer memory further connecting to the active processor for reading of the logged peripheral unit operations by said active processor.

13. Computer equipment according to claim 9, further comprises:
   (a) two central units each including at least one processor and one memory;
   (b) members for selecting between an active central unit function and a backup function for each central unit, wherein, when it is in the active central unit function, the central unit executes the function of the computer by executing programs and carrying out operations against the peripheral units;
   (c) members for connecting the active central unit to and disconnecting the backup central unit from the peripheral units;
   (d) members for disconnecting said active central unit from and connect the backup central unit to the peripheral units when a fault is detected in the active central unit; and
   (e) a device, connected to both central units, including:
   a first buffer memory for connecting to the memory of the active central unit for logging the write operations therein, and for further connecting to the memory of the backup central unit for transfer of the logged write operations to corresponding cells therein; and
   a second buffer memory for connecting via a signal path to the peripheral units for logging read and write operations against said units, and further for connecting to the central units for reading of the logged peripheral unit operations by said central units.

* * * * *